United States Patent [19]
Wei

[11] Patent Number: 5,503,313
[45] Date of Patent: Apr. 2, 1996

[54] MOUNTING DEVICE FOR MOBILE TELEPHONES

[76] Inventor: Kung L. Wei, No. 20, Lane 131, An Pei Road, Tainan City, Taiwan

[21] Appl. No.: 334,508

[22] Filed: Nov. 4, 1994

[51] Int. Cl.$^6$ .................................................... H04M 1/05
[52] U.S. Cl. ...................... 224/197; 224/202; 224/272; 224/901; 379/430; 379/449
[58] Field of Search ....................... 224/181, 197, 224/202, 205, 272, 901; 379/430, 449, 454, 455

[56] References Cited

U.S. PATENT DOCUMENTS

| | | | |
|---|---|---|---|
| 2,506,685 | 5/1950 | Sadloski | 224/197 |
| 2,541,042 | 2/1951 | Curtis | 379/430 |
| 4,802,211 | 1/1989 | Huntley | 224/272 |

FOREIGN PATENT DOCUMENTS

| | | | |
|---|---|---|---|
| 266255 | 3/1964 | Australia | 379/449 |
| 1212375 | 3/1960 | France | 379/449 |

*Primary Examiner*—Henry J. Recla
*Assistant Examiner*—Charles R. Eloshway
*Attorney, Agent, or Firm*—Pro-Techtor International

[57] ABSTRACT

A mounting device for mobile telephones, comprising a belt assembly, a swivel assembly and a telephone holder assembly. The belt assembly, which is to be secured to the user's shoulder, consists of an upper jacket, a lower apron and a pair of Velcro hook and loop fastener pieces. The swivel assembly, which is mounted on the upper jacket by way of fastening screws, consists of a mounting piece and an erecting rod. The telephone holder assembly, which is designed for holding a telephone, consists of a pair of side plates equipped with a set of bolts, spring pieces and an hexagonal nut. With this mounting device for mobile telephones, users can talk on the telephone without having to hold on to it.

1 Claim, 3 Drawing Sheets

MOUNTING DEVICE FOR MOBILE TELEPHONES

BACKGROUND OF THE INVENTION

The present invention concerns a mounting device for mobile telephones and, more particularly, a mounting device for mobile telephones that can be placed on the shoulder of the user, with which the user can carry on a telephone conversation without having to hold on to the mobile telephone.

Mobile telephones have become one of the most popular and practical communication devices in today's society, allowing users to communicate with the outside world while driving or from a remote area. However, the mobile telephone is a hand-held device which is inconvenient for many users. For example, drivers cannot use both hands while using the mobile telephone, which is both inconvenient as well as unsafe; business operators often must interrupt their work in order to free one hand to hold the mobile telephone; and housewives may not be able to do their chores if the mobile telephone is hand-held.

In light of the aforementioned problems, the inventor conducted research aimed at designing a mounting device for mobile telephones that would alleviate the aforementioned problems.

The principal aim of the present invention is to offer a novel mounting device for mobile telephones, with which a driver can mount his mobile telephone on his shoulder, thereby freeing both of his hands.

Another principal aim of the present invention is to offer a novel mounting device for mobile telephones that is equipped with a swiveling component to allow the position of the mobile telephone to be adjusted by the movement of the user.

Another principal aim of the present invention is to offer a novel mounting device for mobile telephones equipped with a belt for securing the mobile telephone on the user's shoulder, thereby allowing the user to continue working without interruption.

The characteristics and technical means of the present invention are explained below in greater detail by means of a practical example and illustrations.

DESCRIPTION OF THE PREFERRED EMBODIMENTS

Figure 1:
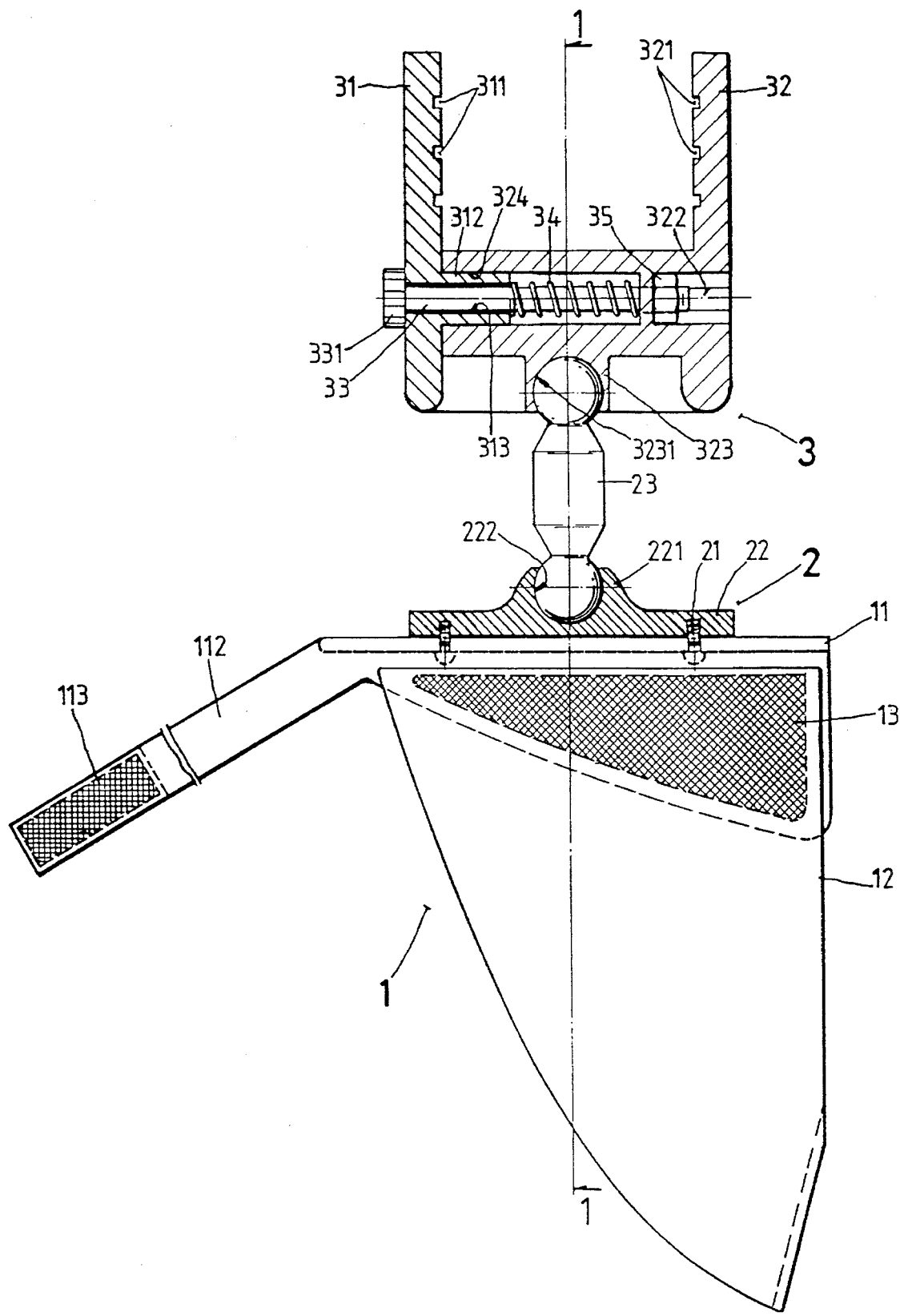
FIG. 1: A diagram showing the components of the device of the present invention.

As shown in FIG. 1, the mounting device for mobile telephones according to the present invention comprises a belt assembly 1, a swivel assembly 2, and a telephone holder assembly 3.

Figure 2:
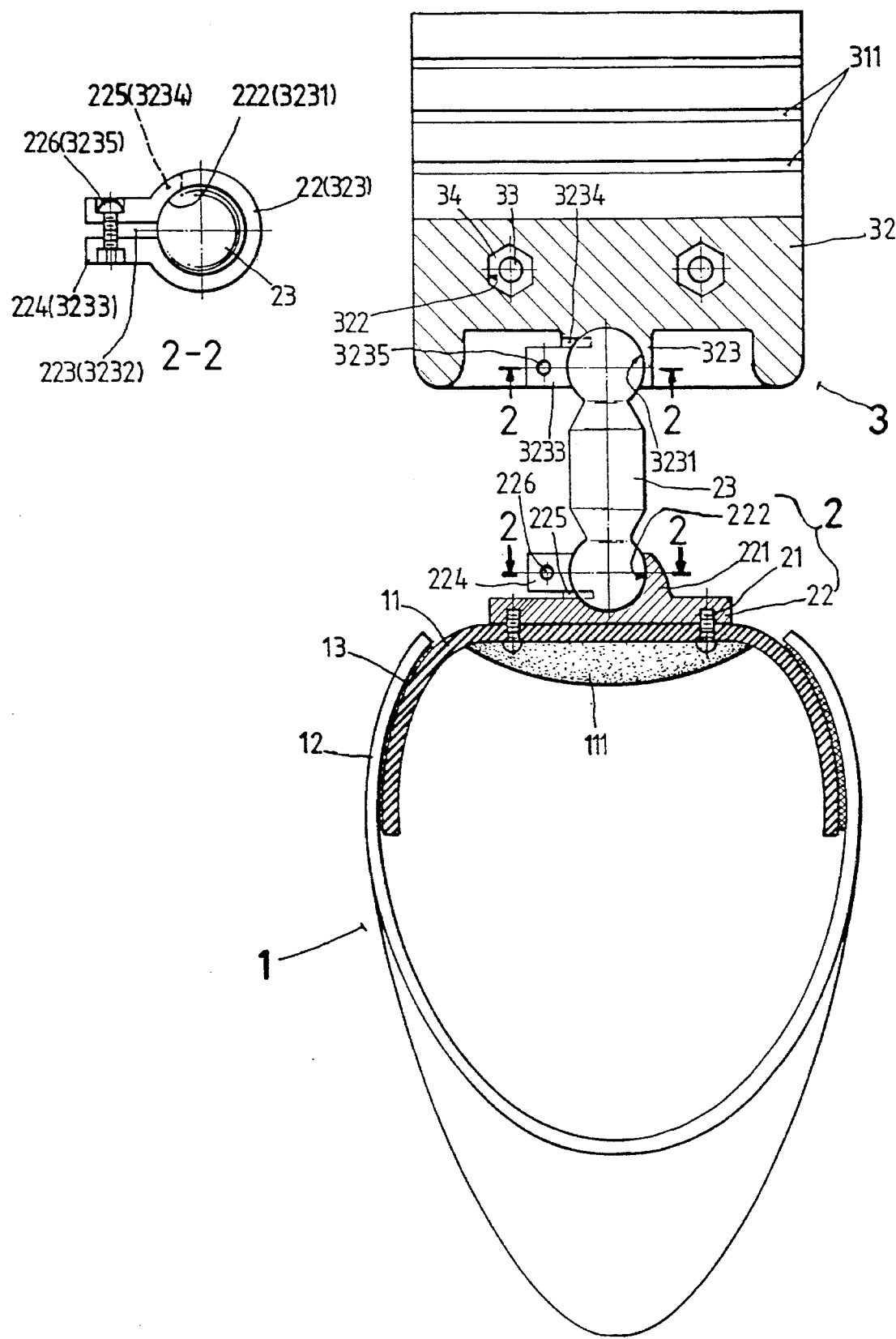
FIG. 2: A Z—Z cross section diagram of the device of the present invention.

The belt assembly 1, which is to be secured onto the user's shoulder, consists of an upper jacket 11, a lower apron 12 and a pair of Velcro hook and loop fastener pieces 13, wherein the upper jacket 11 is equipped with a saddle-like piece that conforms to the user's shoulder, the middle of the inner side of the upper jacket 11 is equipped with a foam cushion 111, as shown in FIG. 2, the end of the upper jacket 11 is equipped with two straps 112 of an appropriate length, the ends of the two straps 112 are each equipped with a Velcro hook and loop fastener piece 113, the lower apron 12 is a U-shaped piece that conforms to the curvature of the arm pit area, and the Velcro hook and loop fastener pieces 13 are a fastening device binding the upper jacket 11 and lower apron 12 together.

The swivel assembly 2, which is mounted on the upper jacket 11 by means of fastening screws 21, consists of a mounting piece 22 and erecting rod 23, wherein the center of said mounting piece is equipped with a protruding rim 221 in the shape of a half circle, the inner side of the protruding rim 221 possesses a round concave hole 222, the outside side of the protruding rim 221 is equipped with a pair of parallel extending plates 224 separated by a gap 223 (see FIG. 2-A for detail), the lower side of one of the extending plates 224 is equipped with a notch 225, the two extending plates 224 are connected by means of a fastening bolt 226, the erecting rod 23 is a connecting piece with both ends fabricated in the shape of a ball, and the lower ball is installed in the round concave hole 222 inside the protruding rim 221.

The telephone holder assembly 3, which is designed to hold a mobile telephone B, consists of a pair of side plates 31 and 32 equipped with a set of bolts 33, spring pieces 34 and hexagonal nuts 35, wherein the upper section of the inside of the left side plate 31 is equipped with several shallow grooves 311, the lower section of the inner side of the left side plate 31 possesses a pair of extending sections 312 at an appropriate location, the center of each of the extending sections 312 is equipped with a through hole 313, the right side plate 32 is a plate with an L-shaped configuration, the inner side of the vertical part of the right side plate 32 possesses several shallow grooves 321, the upper section of the horizontal part of the right side plate 32 possesses a hexagonal recessed hole 322 and a round recessed hole 324 for connecting the left and right sides, the lower section of the horizontal part is equipped at an appropriate location with a protruding rim 323 with an inner round hole 3231; the upper part of the erecting rod 23 can be inserted into the inner round hole 3231, thereby providing a swiveling action, the outer side of the protruding rim 323 is equipped with a pair of parallel extending plates 3233 separated by a gap 3232 (see FIG. 2-A for detail), the lower side of one of the extending plates 3233 is equipped with a notch 3234, the two extending plates 3233 are connected by means of a fastening bolt 3235, and a bolt 33 with a decorated turning head 331 is inserted through hole 313 into the hexagonal recessed hole 322 and screwed into the hexagonal nut 35 together with the spring piece 34.

These components are assembled in the manner shown in FIGS. 1 and 2. First, the two balls at the ends of the erecting rod 23 are inserted into the round concave hole 222 inside the protruding rim 221 at the upper side of the mounting piece 22 and into the round concave hole 3231 inside the protruding rim 323 at the lower right side plate 32, thereby allowing the mounting device to swivel. The fastening bolts 226 and 3235 are used to tighten the two sets of extending plates 224 and 3233, thereby keeping the erecting rod 23 in place to provide swiveling action. Next, bolt 33 equipped with a decorated turning head 331 is inserted through hole 313 into the hexagonal recessed hole 322 and screwed into the hexagonal nut together with the spring piece 34. Finally, the mounting piece 22 is fastened onto the upper jacket by means of fastening screws 21.

Figure 3:
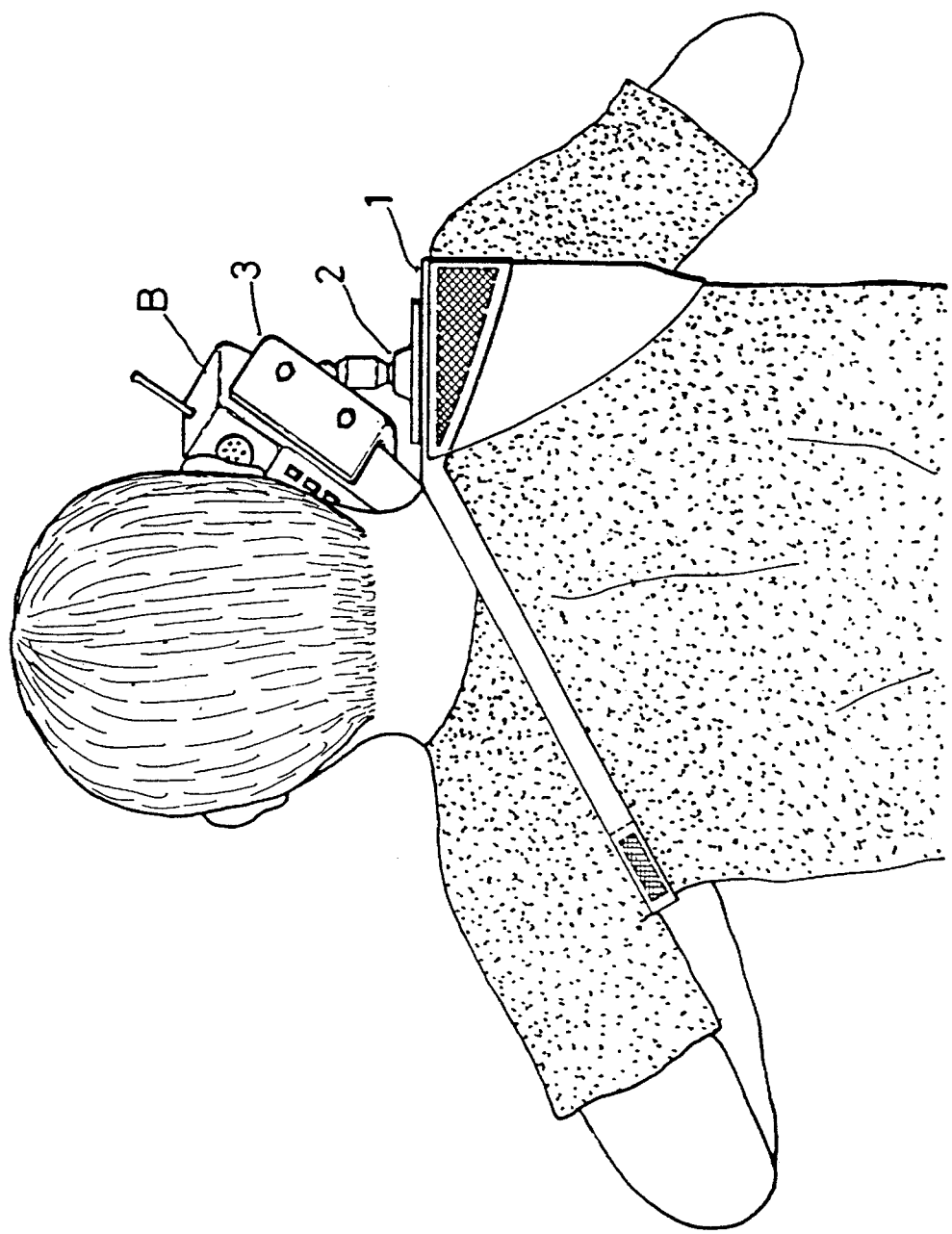
FIG. 3: A figure showing a picture of the device of the present invention in actual use.

The mounting device for mobile telephones of the present invention is worn in the manner shown in FIG. 3. The entire unit, which includes the telephone holder assembly 3, the swivel assembly 2 and the upper jacket 11, is placed on the user's shoulder. The lower apron 12 is then wrapped around the arm pit and attached to the Velcro hook and loop fastener 13 (not shown in the figures), and the strap 112 at the end of the upper jacket 11 is wrapped around the other arm pit and attached to the Velcro hook and loop fastener piece 113.

As shown above, the mounting device for mobile telephones of the present invention possesses the following merits:

(1) The present invention offers a novel mounting device for mobile telephones, with which a driver can mount his mobile telephone on his shoulder, thereby freeing both hands for driving, which increases driving safety.

(2) The mounting device for mobile telephones is equipped with a swivel component to allow the position of the mobile telephone to be adjusted by the movement of the user.

(3) The mounting device for mobile telephones is equipped with a belt for securing the mobile telephone on the user's shoulder, thereby allowing the user to carry on his work without interruption.

(4) The mounting device for mobile telephones is novel, original and not found in the public domain.

What is claimed is:

1. A mounting device for mobile telephones, comprising:

a belt assembly, adapted to be secured to a user's shoulder, said belt assembly having an upper jacket including a saddle-like member adapted to conform to the user's shoulder, a foam cushion connected to an inner side of the upper jacket, a U-shaped lower apron extending downwardly from said upper jacket and adapted to conform to the user's arm pit, and two straps connected at proximal ends thereof to opposing edges of said upper jacket, each strap having one of a pair of cooperating hook and loop fasteners at a distal end thereof, whereby, said upper jacket is placed over a shoulder of the user with said lower apron conforming to the corresponding arm pit and said straps extend about the torso of the user and are secured thereabout;

a swivel assembly mounted on the upper jacket by fastening screws, said swivel assembly having a mounting piece and an erecting rod, wherein a center portion of said mounting piece has a protruding circular rim with an inner side of said rim having a round, concave hole and an outer side of said rim having a pair of parallel plates extending therefrom, said plates being separated by a gap and adjustably connected by means of an adjustable first fastening bolt, and said erecting rod having opposing ball shaped ends, one of which is received in said concave hole of said mounting piece, whereby said erecting rod may swivel with respect to said mounting piece when said first fastening bolt is moved to a first loosened position, and said rod is prevented from swivelling when said first fastening bolt is moved to a second tightened position;

a telephone holder assembly adapted to hold the mobile telephone, said telephone holder assembly comprising an L-shaped left side plate having a vertical leg and a horizontal lower section, and a right side plate having a vertical leg and a horizontal lower section extending therefrom;

said lower sections of each plate each having a hole extending therethrough for receiving a bolt, said left side plate lower section further having a hexagonal hole for receiving a hexagonal nut connected to said bolt, whereby said plates are adjustably connected for gripping said telephone between said vertical legs of said plates;

said left side plate further including a protruding circular rim extending downwardly from said horizontal lower section, said rim having a round, concave hole on an inner side thereof and a pair of parallel plates extending from an outer side thereof, said plates being separated by a gap and adjustably connected by means of an adjustable second fastening bolt;

the other of said ball shaped ends of said erecting rod being received in said concave hole on said left side plate, whereby, said telephone holder assembly may swivel with respect to said erecting rod when said second fastening bolt is moved to a first loosened position, and said telephone holder assembly is prevented from swivelling when said second fastening bolt is moved to a second tightened position.

* * * * *